White & Agnew.
Lamp Burner.

Nº 36,380.   Patented Sept. 2, 1862.

Witnesses:
Jas. B. Shrigley
Charles Howson

Inventor:
White & Agnew
Henry Howson
Atty

UNITED STATES PATENT OFFICE.

JOSEPH WHITE AND ANGUS AGNEW, OF PHILADELPHIA, PENNSYLVANIA.

COAL OIL LAMP.

Specification forming part of Letters Patent No. 36,380, dated September 2, 1862.

*To all whom it may concern:*

Be it known that we, JOSEPH WHITE and ANGUS AGNEW, both of Philadelphia, Pennsylvania, have invented an Improvement in Coal-Oil Lamps; and we do hereby declare the following to be a full, clear, and exact description of the same, reference being had to the accompanying drawings, and to the letters of reference marked thereon.

Our invention consists of a device, fully described hereinafter, to be attached to a coal-oil lamp for the purpose of spreading the flame, preventing smoke, and dispensing with the usual glass chimney.

In order to enable others skilled in the art to make and use our invention, we will now proceed to describe its construction and operation.

Figure 1:
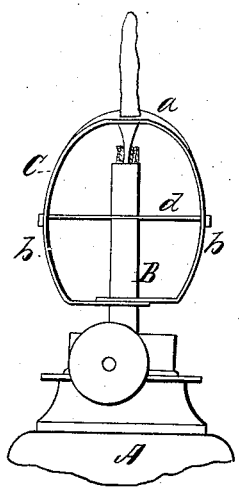
Figure 2:
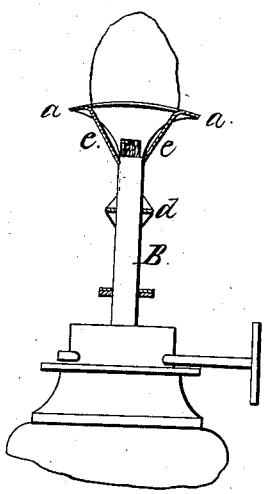

On reference to the accompanying drawings, which form a part of this specification, Figure 1 is a side view of our improved spreader and smoke-consumer for coal-oil lamps; Fig. 2, a vertical section, and Fig. 3 a plan view.

Similar letters refer to similar parts throughout the several views.

A represents a portion of the reservoir of a coal-oil lamp, and B the wick-tube, which in the present instance is of a proper form for the reception of a simple round wick.

Figure 3:
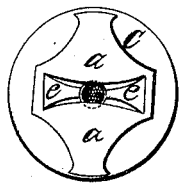

C is the flame-spreader and smoke-consumer, which consists of a bent plate, the top *a* of which is of the form represented in Fig. 3, two thin and narrow strips, *b b*, extending from this top in the direction shown in Fig. 1, and the lower ends of these strips being secured to the wick-tube B. In order to steady the strips and secure them more firmly to the wick-tube, the latter is embraced by a cross-stay, *d*, the opposite ends of which are secured to the opposite strips *b b*. An elongated opening is formed in the top *a*, and from each end of this opening an inclined strip, *e*, extends to the top of the wick-tube, which is situated at a distance of half an inch, or thereabout, below the top *a* of the flame-spreader.

Although the wick is round, the flame will follow the direction of the inclined strips *e e*, Fig. 2, and at the point where the flame passes through the elongated opening it will be spread out to a width equal to the length of the said opening.

From the top *a* of the spreader the flame extends upward in the form represented by red lines, Fig. 2.

While the angular strips *e e* serve to direct the flame, to spread it outward, and cause it to assume a definite form, the air rushes from below through the opening in the top *a*, and, impinging against both sides of the flame, causes it to burn with brilliancy and unaccompanied with the usual disagreeable smoke, and this without the aid of the usual glass chimney.

One of the most important features of our invention is the facility which it affords of converting an ordinary fluid-lamp into a coal-oil lamp, the simple attachment of the spreader to the tube of the fluid-lamp being all that is necessary for accomplishing the desired conversion.

It will be readily seen that our improvements can be applied to lamps with flat wick-tubes.

We claim as our invention and desire to secure by Letters Patent—

The spreader having in its top *a* an elongated opening and inclined or curved strips extending from the ends of the said opening to the upper edge of the wick-tube, the whole being applied to the wick-tube or cap of a coal-oil lamp, as set forth, for the purpose specified.

In testimony whereof we have signed our names to this specification in the presence of two subscribing witnesses.

JOSEPH WHITE.
ANGUS AGNEW.

Witnesses:
HENRY HOWSON,
JOHN WHITE.